United States Patent
Jin et al.

(10) Patent No.: US 9,021,247 B2
(45) Date of Patent: Apr. 28, 2015

(54) HOME NETWORK CONTROLLING APPARATUS AND METHOD TO OBTAIN ENCRYPTED CONTROL INFORMATION

(75) Inventors: Ho Jin, Yongin-si (KR); Jong-wook Park, Seoul (KR); Young-chul Sohn, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1156 days.

(21) Appl. No.: 12/389,750

(22) Filed: Feb. 20, 2009

(65) Prior Publication Data

US 2009/0265540 A1 Oct. 22, 2009

Related U.S. Application Data

(60) Provisional application No. 61/046,553, filed on Apr. 21, 2008.

(30) Foreign Application Priority Data

Sep. 26, 2008 (KR) .................... 10-2008-0094747

(51) Int. Cl.
*H04L 9/00* (2006.01)
*H04L 29/06* (2006.01)

(52) U.S. Cl.
CPC ........... *H04L 63/0428* (2013.01); *H04L 63/166* (2013.01)

(58) Field of Classification Search
None
See application file for complete search history.

(56) References Cited

U.S. PATENT DOCUMENTS

| | | | | | |
|---|---|---|---|---|---|
| 6,978,298 | B1* | 12/2005 | Kuehr-McLaren | ........... | 709/223 |
| 7,590,687 | B2* | 9/2009 | Bales et al. | .................. | 709/203 |
| 7,647,394 | B2* | 1/2010 | Rao et al. | ..................... | 709/223 |
| 8,032,765 | B2* | 10/2011 | Dettinger et al. | ............ | 713/193 |
| 2003/0018753 | A1* | 1/2003 | Seki | .............................. | 709/219 |
| 2004/0039911 | A1* | 2/2004 | Oka et al. | ..................... | 713/175 |
| 2004/0205172 | A1 | 10/2004 | Kim | | |

(Continued)

FOREIGN PATENT DOCUMENTS

| | | |
|---|---|---|
| CN | 1523828 A | 8/2004 |
| CN | 1804797 A | 7/2006 |

(Continued)

OTHER PUBLICATIONS

Communication dated Aug. 12, 2013, issued by the State Intellectual Property Office of P.R.C. in counterpart Chinese Application No. 200980114041.0.

(Continued)

*Primary Examiner* — William Powers
(74) *Attorney, Agent, or Firm* — Sughrue Mion, PLLC

(57) ABSTRACT

A network control apparatus and method is provided. The method includes operations of informing a server of capability information including an encryption/decryption method, wherein the server provides the network control apparatus with control information used to control a network device using a general-purpose control web application, transmitting to the server a control information requesting message that requests the control information, receiving from the server the control information which has been encrypted using the encryption/decryption method, decrypting the encrypted control information according to the encryption/decryption method, and transmitting a control command for controlling the network device according to the decrypted control information.

16 Claims, 6 Drawing Sheets

(56) References Cited

U.S. PATENT DOCUMENTS

| | | |
|---|---|---|
| 2005/0283618 A1 | 12/2005 | Min |
| 2006/0150241 A1 | 7/2006 | Huh et al. |
| 2006/0156281 A1 | 7/2006 | Yoon et al. |
| 2010/0305722 A1 | 12/2010 | Jin et al. |

FOREIGN PATENT DOCUMENTS

| | | |
|---|---|---|
| JP | 2003-30072 A | 1/2003 |
| KR | 10-2006-0006559 A | 1/2006 |
| KR | 10-2006-0064976 A | 6/2006 |
| KR | 10-2006-0117605 A | 11/2006 |
| KR | 10-2009-0054940 A | 6/2009 |
| TW | 200500894 | 1/2005 |
| WO | 2007/004754 A1 | 1/2007 |

OTHER PUBLICATIONS

Communication, dated Feb. 4, 2013, issued by the State Intellectual Property Office of P.R. China in counterpart Chinese Patent Application No. 200980114041.0.

Communication dated Nov. 17, 2014 issued by the Korean Intellectual Property Office in counterpart Korean Application No. 10-2008-0094747.

* cited by examiner

FIG. 4

```
<?xml version="1.0" encoding="UTF-8"?>
<!DOCTYPE html PUBLIC "-//W3C//DTD XHTML 1.0
    Transitional//EN" "http://www.w3.org/TR/xhtml1/DTD/xhtml1-transitional.dtd">
<html xmlns="http://www.w3.org/1999/xhtml">
<head><title>UPnP MrCP Example</title> <script type="text/javascript">
    ...
PlayUrl(Url)
{
  did = FindDevice("MediaRenderer");
  sid = FindService("AVTransport");
  if(sid)
  {
      soap_info_request(AVInfo);              —— 410
      ret = UPnPAction(did, sid, dom_Soap);   —— 420
      soap_info_request(PlayInfo);            —— 430
      ret = UPnPAction(did, sid, dom_Soap);   —— 440
   ...
  }

</script></head>
<body onload="..."> </body>
</html>
```

450 dom_Soap = \<actionName\>SetAVTransportURI\</actionName\>
          \<arguments\>\<InstanceID\>0\</InstanceID\>
              \<CurrentURI\>http://192.1.1.42/movie/sbc.mpeg\</CurrentURI\>
          \<CurrentURIMetaData/\>\</arguments\>;
dom_Soap = \<actionName\>Play\</actionName\>
          \<arguments\>\<InstanceID\>0\</InstanceID\>
          \<Speed\>1\</Speed\>\</arguments\>;
RECEIVED XML INFORAMTION HAS BEEN ENCRYPTED.

HOME NETWORK CONTROLLING APPARATUS AND METHOD TO OBTAIN ENCRYPTED CONTROL INFORMATION

CROSS-REFERENCE TO RELATED PATENT APPLICATION

This application claims the benefit of U.S. Provisional Patent Application No. 61/046,553, filed on Apr. 21, 2008, in the U.S. Patent and Trademark Office, and the benefit of Korean Patent Application No. 10-2008-0094747, filed on Sep. 26, 2008, in the Korean Intellectual Property Office, the disclosures of which are incorporated herein in their entirety by reference.

BACKGROUND OF THE INVENTION

1. Field of the Invention

The present invention relates to a service for stably controlling a home network apparatus, and more particularly, to a home network controlling apparatus and method for obtaining encrypted device-control information from a server.

2. Description of the Related Art

Due to the increased distribution of home networks, an existing network environment centered on PCs in houses is extending to include home appliances that use various low-level network technologies. Accordingly, a home network middleware standard such as Universal Plug and Play (UPnP) technology has been proposed because of the necessity of a technique capable of networking these home appliances by using an IP protocol according to a standardized method.

UPnP technology defines a plurality of UPnP devices for providing services to a user, and a UPnP-dedicated control application, which is called a control point (CP), for controlling these devices.

The CP is an application which is installed in an apparatus equipped with a user interface, such as a PC and a TV, and controls a plurality of UPnP devices. The CP discovers various devices according to external inputs, obtains the capabilities of the discovered devices, and controls services of the devices by using a simple object access protocol (SOAP).

The UPnP devices are a PC, network equipment, a printer, and various audio/video (A/V) devices which are connected to a home network, and inform the CP of events generated by the UPnP devices. The UPnP devices provide a presentation web page to the CP so that the CP can control the devices and perform a state inquiry by using the web page.

As described above, in a UPnP device controlling method which is provided by conventional UPnP technology, a UPnP-dedicated control application, which is called a CP, is used, or a static presentation web page which is provided by UPnP devices is used.

SUMMARY OF THE INVENTION

An aspect of the present invention provides a network controlling apparatus and method for obtaining an encrypted device-control command and parameter as control information in order to stably control a network device.

According to an aspect of the present invention, there is provided an encrypted control information obtaining method performed in a network control apparatus, the method including informing a server of capability information including an encryption/decryption method, wherein the server provides the network control apparatus with control information used to control a network device according to a general-purpose control web application; transmitting to the server a control information requesting message that requests the control information; receiving from the server the control information which has been encrypted using the encryption/decryption method; decrypting the encrypted control information according to the encryption/decryption method; and transmitting a control command for controlling the network device according to the decrypted control information.

The informing of the server of the capability information, the transmitting to the server of the control information requesting message, and the receiving from the server of the encrypted control information may be performed using an asynchronous communicating method with HyperText Transfer Protocol (HTTP) communication for constructing a user interface screen of the network control apparatus.

The encrypted control information obtaining method may further include receiving a result of a processing of the control command for the network device from the network device; and providing the result of the processing of the control command to a web browser.

The decrypting of the encrypted control information, the transmitting of the control command for controlling the network device, and the receiving of the result of the processing of the control command for the network device from the network device may be performed by one of the web browser and a plug-in application of the web browser.

The network may be a Universal Plug and Play (UPnP)-based network. The network device may be a UPnP device. The control command for controlling the network device may be generated in a form of a UPnP simple object access protocol (SOAP) action.

The encryption/decryption method may be at least one of symmetrical encryption/decryption algorithms and public key encryption/decryption algorithms.

According to another aspect of the present invention, there is provided an encrypted control information providing method performed in a server, the method including receiving capability information including an encryption/decryption method from a network controlling apparatus; receiving from the network controlling apparatus a control information requesting message that requests control information used to control a network device according to a general-purpose control web application; encrypting the control information according to the encryption/decryption method; and transmitting the encrypted control information to the network controlling apparatus.

According to another aspect of the present invention, there is provided a computer readable recording medium having recorded thereon a computer program for executing the encrypted control information obtaining method.

According to another aspect of the present invention, there is provided a computer readable recording medium having recorded thereon a computer program for executing the encrypted control information providing method.

According to another aspect of the present invention, there is provided a network control apparatus including a capability information informing unit which informs a server of capability information including an encryption/decryption method, wherein the server provides the network control apparatus with control information used to control a network device using a general-purpose control web application; a control information request transmitting unit which transmits to the server a control information requesting message that requests the control information; a control information receiving unit which receives from the server the control information which has been encrypted using the encryption/decryption method; a decrypting unit which decrypts the encrypted control information according to the encryption/ decryption method; and a control command transmitting unit which transmits a control command for controlling the network device according to the decrypted control information.

According to another aspect of the present invention, there is provided a server including a capability information receiving unit which receives capability information including an encryption/decryption method from a network controlling apparatus; a control information request receiving unit which receives from the network controlling apparatus a control information requesting message that requests control information used to control a network device according to a general-purpose control web application; an encrypting unit which encrypts the control information according to the encryption/decryption method; and a control information transmitting unit which transmits the encrypted control information to the network controlling apparatus.

BRIEF DESCRIPTION OF THE DRAWINGS

The above and other features and advantages of the present invention will become more apparent by describing in detail exemplary embodiments thereof with reference to the attached drawings in which:

FIG. 4 illustrates an encrypted control information obtaining process which is performed by the home network controlling apparatus and is described using Extensible Markup Language (XML), according to an exemplary embodiment of the present invention;

DETAILED DESCRIPTION OF THE EXEMPLARY EMBODIMENTS OF THE INVENTION

Figure 1:
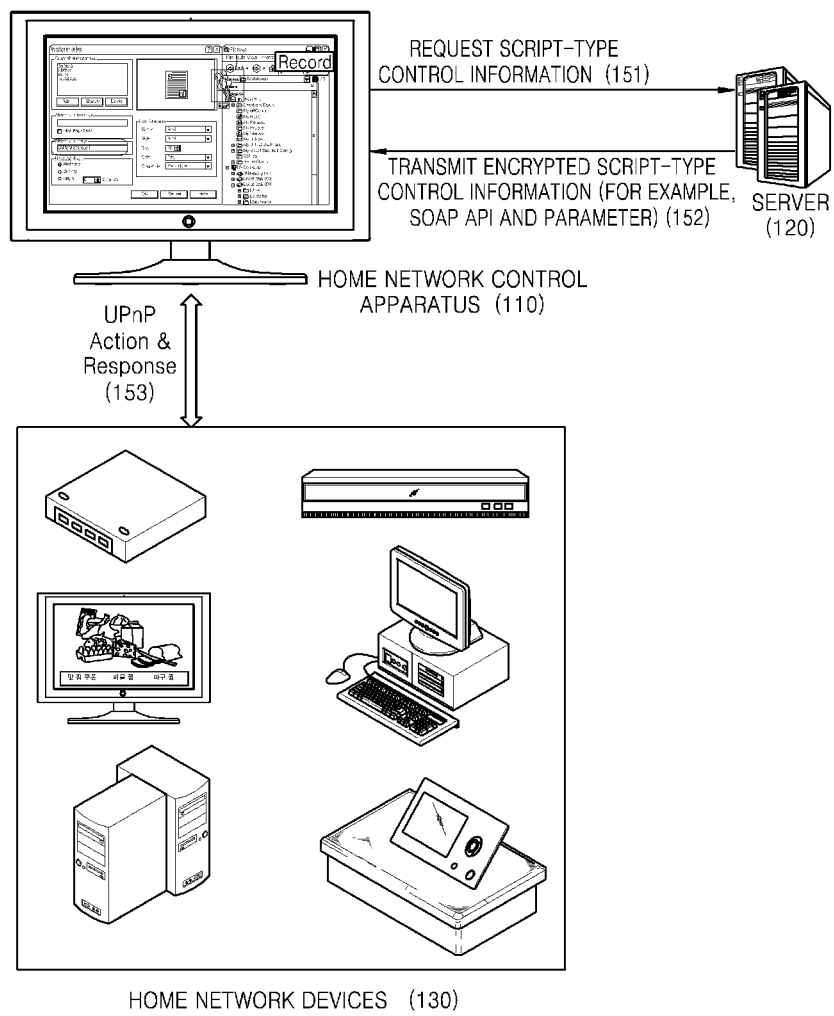
FIG. 1 illustrates a network environment where a server provides a home network control apparatus with encrypted control information, according to an exemplary embodiment of the present invention.

The present invention will now be described more fully with reference to the accompanying drawings, in which exemplary embodiments of the invention are shown. In the drawings, the sizes of elements are exaggerated for clarity. Like reference numerals in the drawings denote like elements, and thus their description will be omitted.

FIG. 1 illustrates a network environment where a server 120 provides a home network control apparatus 110 with encrypted control information, according to an exemplary embodiment of the present invention.

In operation 151, the home network control apparatus 110 requests the server 120 to provide script-type control information used to control home network devices 130, through asynchronous communications with the server 120. At this time, the home network control apparatus 110 informs the server 120 of capability information including a method of encrypting/decrypting the script-type control information (hereinafter, referred to as an encryption/decryption method).

In response to the capability information including the encryption/decryption method and a control information requesting message from the home network control apparatus 110, the server 120 encrypts the script-type control information according to an encryption/decryption algorithm, that is, the encryption/decryption method included in the capability information. In operation 152, the server 120 transmits the encrypted script-type control information to the home network control apparatus 110.

The server 120 may encrypt the entire script-type control information or only a part directly associated with home network device control from the script-type control information. For example, information associated with construction of a general user interface screen, and information used to process an event may be provided to users in a readable form.

The home network control apparatus 110 receives the encrypted script-type control information from the server 120 and transmits the encrypted script-type control information to a plug-in application that performs a control point (CP) function. The plug-in application is a program that helps a web browser to execute unsupported functions. The plug-in application in the present exemplary embodiment performs functions of searching and controlling Universal Plug and Play (UPnP) devices connected to a home network and other functions.

The plug-in application in the home network control apparatus 110 decrypts the encrypted script-type control information according to the encryption/decryption algorithm, extracts a control command and parameter for performing a predetermined service for the home network devices 130 from the decrypted script-type control information, and transmits the control command and parameter to the home network devices 130 (operation 153). The control command in the present exemplary embodiment may be generated in the form of a UPnP simple object access protocol (SOAP) action.

The plug-in application in the home network control apparatus 110 receives a result of the processing of the control command from the home network devices 130 (operation 153) and provides the result of the processing of the control command to a web browser in the form of a script, thereby constructing a user interface screen.

In an exemplary embodiment of the present invention, the server 120 may divide the script-type control information, which is used to control the home network devices 130, into user-readable information and user-unreadable information and provide the user-readable information and the user-unreadable information to the home network control apparatus 110, in order to ensure stability in a case where the home network devices 130 are controlled using a general-purpose control web application. In other words, the server 120 provides to the home network control apparatus 110 the information directly associated with home network device control as information that cannot be read by users who are not authorized through the encryption/decryption algorithm. Thus, even if malicious users sniff a control information message in a network, they may be prevented from controlling the home network devices 130.

Figure 2:
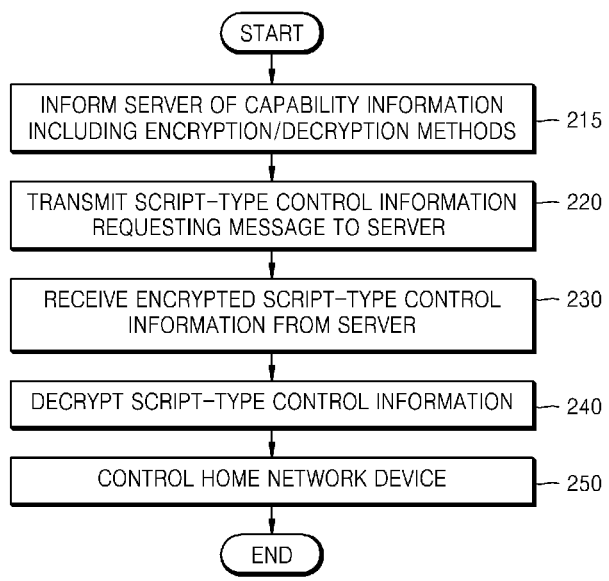
FIG. 2 is a flowchart illustrating an encrypted control information obtaining process performed by a home network controlling apparatus, according to an exemplary embodiment of the present invention.

FIG. 2 is a flowchart illustrating an encrypted control information obtaining process performed by the home network controlling apparatus 110, according to an exemplary embodiment of the present invention.

In operation 215, the home network control apparatus 110 informs the server 120 of capability information including encryption/decryption methods.

In operation 220, the home network control apparatus 110 transmits, to the server 120 via a general-purpose control web application, a control information requesting message that requests control information used to control a home network device.

The encryption/decryption methods may be at least one of symmetrical encryption/decryption algorithms and public key encryption/decryption algorithms. Examples of the symmetrical encryption/decryption algorithms may include a Data Encryption Standard (DES), and an Advanced Encryption Standard (AES). Examples of the public key encryption/decryption algorithms may include a Rivest-Shamir-Adelman (RSA) algorithm.

In the present exemplary embodiment, one of Transport Layer Security (TLS), Secure HyperText Transfer Protocol (S-HTTP), etc. may be used as an encryption/decryption system including the encryption/decryption methods.

The TLS is an Internet Engineering Task Force (IETF) standard for providing end-to-end security above a transmission layer. End-to-end authentication is provided by a public key algorithm and an X. 509 public key certificate. End-to-end confidentiality is provided by a secret key (for example, a session key) shared by handshake protocols. End-to-end integrity is provided by a message authentication code (MAC). The TLS is defined in RFC 4346, so a detailed description thereof will be omitted herein.

The S-HTTP is an IETF standard for providing end-to-end security on an upper layer of an HTTP application protocol, and may be used as a substitute for the TLS. The S-HTTP also provides end-to-end authentication, and confidentiality and integrity with respect to an HTTP Request/Response message. The S-HTTP is defined in RFC 2660, so a detailed description thereof will be omitted herein.

In the present exemplary embodiment, the control information requesting message is transmitted using an asynchronous communication method with HTTP communication for constructing a user interface screen. The asynchronous communication method in the present exemplary embodiment may be implemented using Asynchronous JavaScript And XML (Ajax). Ajax denotes a web developing technique for manufacturing a dialog-type web application, and is able to asynchronously exchange data with a web server and manipulate the data. A detailed description of the operation of Ajax will be omitted herein.

In operation 230, the home network control apparatus 110 receives from the server 120 script-type control information which has been encrypted using the encryption/decryption methods included in the capability information.

In operation 240, the home network control apparatus 110 decrypts the script-type control information according to one of the encryption/decryption methods included in the capability information.

In operation 250, the home network control apparatus 110 transmits a control command for performing a predetermined service for the home network device to the home network device according to the decrypted script-type control information. In the present exemplary embodiment, a home network is a UPnP-based home network, and the home network device is a UPnP device. The home network control apparatus 110 generates the control command by using a UPnP SOAP action and transmits the control command to the home network device.

Thereafter, the home network control apparatus 110 receives a result of the processing of the control command as a response to the UPnP SOAP action from the home network device, and provides the result of the processing of the control command to a web browser in the form of a script.

Figure 3:
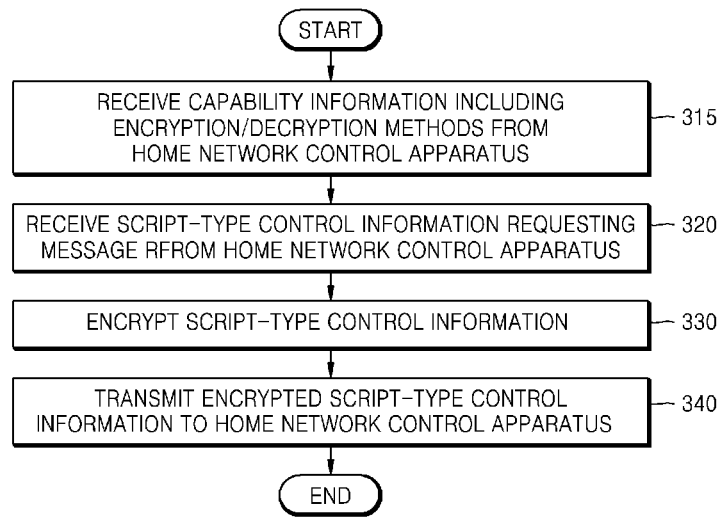
FIG. 3 is a flowchart illustrating an encrypted control information providing process performed by a server, according to an exemplary embodiment of the present invention.

FIG. 3 is a flowchart illustrating an encrypted control information providing process performed by the server 120, according to an exemplary embodiment of the present invention.

In operation 315, the server 120 receives the capability information including the encryption/decryption methods from the home network control apparatus 110. The encryption/decryption methods in the present exemplary embodiment may be at least one of symmetrical encryption/decryption algorithms and public key encryption/decryption algorithms.

In operation 320, the server 120 receives from the home network control apparatus 110 the control information requesting message that requests script-type control information used to control a home network device.

In operation 330, the server 120 encrypts the script-type control information according to one of the encryption/decryption methods provided by the capability information.

In operation 340, the server 120 transmits the encrypted script-type control information to the home network control apparatus 110.

FIG. 4 illustrates an encrypted control information obtaining process which is performed by the home network controlling apparatus 110 and is described using Extensible Markup Language (XML), according to an exemplary embodiment of the present invention.

In operations 410 and 430, the home network control apparatus 110 receives the encrypted script-type control information from the server 120 via an application programming interface (API) called "soap_info_request".

In operations 420 and 440, the encrypted script-type control information is transmitted to a plug-in application which performs decryption and substantial control via an API called "UPnPAction". The plug-in application, which performs such a control point function, extracts the title of a UPnP SOAP action and a parameter corresponding to the UPnP SOAP action from decrypted control information 450 and transmits the UPnP SOAP action title and the parameter to a home network device through a UPnP SOAP action message.

In another exemplary embodiment of the present invention, if a web browser includes the decryption function and the substantial control function, the web browser may perform the decryption function and the substantial control function instead of transmitting the encrypted control information to the plug-in application.

Figure 5:
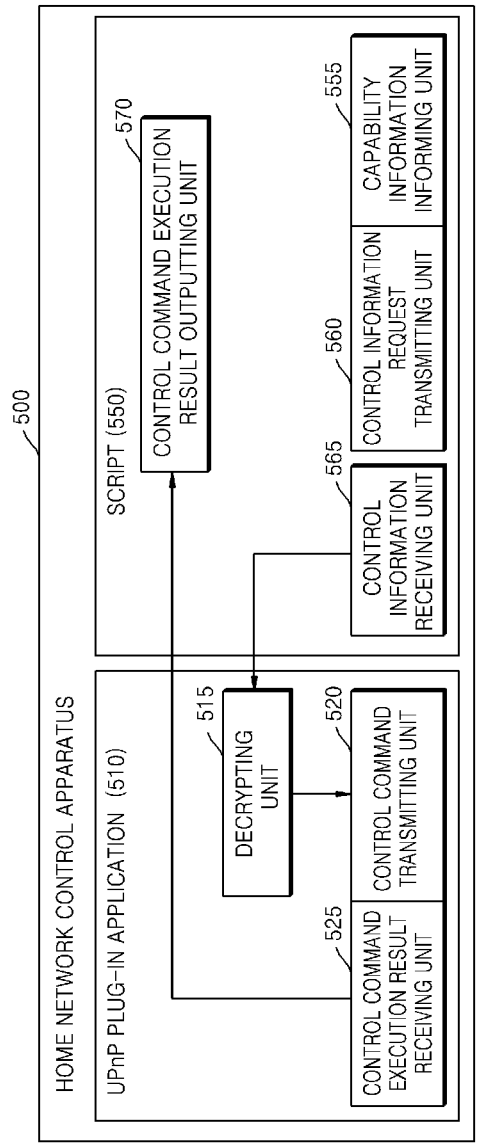
FIG. 5 is a block diagram of a home network controlling apparatus for obtaining encrypted control information, according to an exemplary embodiment of the present invention.

FIG. 5 is a block diagram of a home network controlling apparatus 500 for obtaining encrypted control information, according to an exemplary embodiment of the present invention. Referring to FIG. 5, the home network control apparatus 500 includes a capability information informing unit 555, a control information request transmitting unit 560, a control information receiving unit 565, a decrypting unit 515, a control command transmitting unit 520, a control command execution result receiving unit 525, and a control command execution result outputting unit 570. Functions of the decrypting unit 515, the control command transmitting unit 520, and the control command execution result receiving unit 525 may be performed by a plug-in application 510 of a web browser or by the web browser itself.

The capability information informing unit 555 informs the server 120 of capability information including predetermined encryption/decryption methods. The encryption/decryption methods in the present exemplary embodiment may be at least one of symmetrical encryption/decryption algorithms and public key encryption/decryption algorithms.

Examples of the symmetrical encryption/decryption algorithms may include a DES, and an AES. Examples of the public key encryption/decryption algorithms may include a RSA algorithm. In the present exemplary embodiment, one of TLS, S-HTTP, etc. may be used as an encryption/decryption system including the encryption/decryption methods.

The control information request transmitting unit 560 transmits to the server 120 a control information requesting message which requests script-type control information used to control a home network device.

The control information receiving unit 565 receives from the server 120 script-type control information which has been encrypted using one of the encryption/decryption methods provided through the capability information.

The capability information informing unit 555, the control information request transmitting unit 560, and the control information receiving unit 565 transmit and receive information by using an asynchronous communication method with HTTP communication for constructing a user interface screen. The asynchronous communication method in the present exemplary embodiment may be implemented using Ajax.

The decrypting unit 515 decrypts the script-type control information according to one of the encryption/decryption methods provided through the capability information.

The control command transmitting unit 520 transmits a control command for performing a predetermined service for the home network device to the home network device according to the decrypted script-type control information.

In the present exemplary embodiment, a home network is a UPnP-based home network, and the home network device is a UPnP device. The home network control apparatus 500 generates the control command by using a UPnP SOAP action and transmits the control command to the home network device.

The control command execution result receiving unit 525 receives a result of the processing of the control command from the home network device. The result of the processing of the control command is a response to the UPnP SOAP action.

The control command execution result outputting unit 570 provides the result of the processing of the control command to a web browser in the form of a script 550.

The decrypting unit 515, the control command transmitting unit 520, and the control command execution result receiving unit 525 are provided as a plug-in application 510 of the web browser. The plug-in application 510 of the web browser of the home network control apparatus 500 performs a control point function. The plug-in application 510 in the home network control apparatus 500 decrypts the encrypted control information, extracts the title of the UPnP SOAP action and a parameter corresponding to the UPnP SOAP action from the decrypted control command, and transmits the UPnP SOAP action title and the parameter to the home network device through a UPnP SOAP action message. The plug-in application 510 in the home network control apparatus 500 receives from the home network device a response to the UPnP SOAP action corresponding to the result of the processing of the control command.

Figure 6:
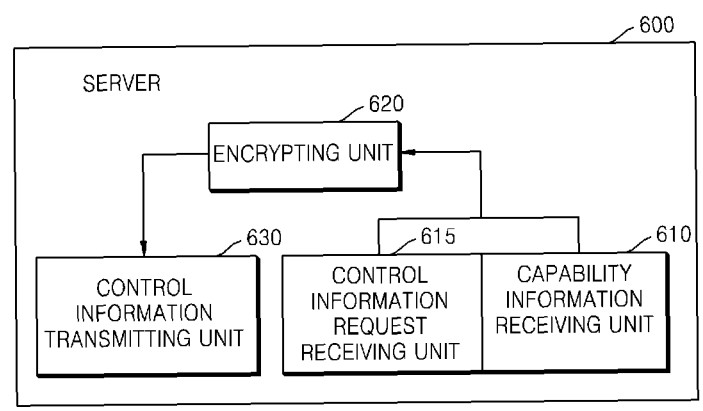
FIG. 6 is a block diagram of a server for providing a home network control apparatus with encrypted control information, according to an exemplary embodiment of the present invention.

FIG. 6 is a block diagram of a server 600 for providing the home network control apparatus 110 with encrypted control information, according to an exemplary embodiment of the present invention. Referring to FIG. 6, the server 600 includes a capability information receiving unit 610, a control information request receiving unit 615, an encrypting unit 620, and a control information transmitting unit 630.

The capability information receiving unit 610 receives capability information including predetermined encryption/decryption methods from the home network control apparatus 110.

The control information request receiving unit 615 receives a control information requesting message which requests script-type control information used to control a home network device, from the home network control apparatus 110.

The encrypting unit 620 encrypts the script-type control information according to one of the predetermined encryption/decryption methods provided through the capability information.

The control information transmitting unit 630 transmits the encrypted script-type control information to the home network control apparatus 110.

Exemplary embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs). Also, exemplary embodiments of the present invention can be written as computer programs and can be implemented in general-use digital computers that execute the programs using a computer readable transmitting medium. Examples of the computer readable transmitting medium include storage media such as carrier waves (e.g., transmission through the Internet).

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An encrypted control information obtaining method performed in a network control device, the method comprising:
   transmitting to a server a message for requesting control information, wherein the control information and other information are provided to the network control device from the server, the control information being used to control a network device, and the other information being used to configure a user interface or process an event;
   receiving from the server the control information, which has been encrypted using an encryption process;
   decrypting the encrypted control information according to a decryption process corresponding to the encryption process; and
   transmitting a control command for controlling the network device according to the decrypted control information,
   wherein the other information is not encrypted by the server.

2. The encrypted control information obtaining method of claim 1, wherein the transmitting to the server of the control information requesting message, and the receiving from the server of the encrypted control information are performed using an asynchronous communicating method with Hyper-Text Transfer Protocol (HTTP) communication for constructing a user interface screen of the network control apparatus.

3. The encrypted control information obtaining method of claim 1, further comprising:
   receiving a result of processing the control command for the network device from the network device; and
   providing the result of processing the control command to a web browser.

4. The encrypted control information obtaining method of claim 3, wherein the decrypting of the encrypted control information, the transmitting of the control command for controlling the network device, and the receiving of the result of processing the control command for the network device from the network device are performed by one of the web browser and a plug-in application of the web browser.

5. The encrypted control information obtaining method of claim 1, wherein:
the network is a Universal Plug and Play (UPnP)-based network;
the network device is a UPnP device; and
the control command for controlling the network device is generated in a form of a UPnP simple object access protocol (SOAP) action.

6. The encrypted control information obtaining method of claim 1, wherein the encryption process and the decryption process uses at least one of symmetrical encryption/decryption algorithms and public key encryption/decryption algorithms.

7. An encrypted control information providing method performed in a server, the method comprising:
receiving from a network controlling apparatus a control information requesting message that requests control information and other information, the control information being used to control a network device and the other information being used to configure a user interface or process an event;
encrypting the control information according to an encryption process; and
transmitting the encrypted control information to the network controlling apparatus, wherein the server encrypts the control information and does not encrypt the other information used to configure the user interface or process the event.

8. A network control apparatus comprising:
a control information request transmitting unit which transmits to a server a control information requesting message that requests control information;
a control information receiving unit which receives the control information from the server, which has been encrypted using an encryption process;
a decrypting unit which decrypts the encrypted control information according to a decryption process corresponding to the encryption process; and
a control command transmitting unit which transmits a control command for controlling a network device according to the decrypted control information,
wherein the server provides the network control apparatus with control information and other information, the control information is used to control a network device, and the other information is used to configure a user interface or process an event,
wherein the server encrypts the control information and does not encrypt the other information used to configure the user interface or process the event.

9. The network control apparatus of claim 8, wherein the control information request transmission unit, and the control information receiving unit respectively transmit and receive information by using an asynchronous communicating method with Hypertext transfer protocol (HTTP) communication for constructing a user interface screen of the network control apparatus.

10. The network control apparatus of claim 8, further comprising:
a control command execution result receiving unit which receives a result of processing the control command for the network device from the network device; and
a control command execution result outputting unit which provides the result of processing the control command to a web browser.

11. The network control apparatus of claim 10, wherein functions of the decryption unit, the control command transmitting unit, and the control command execution result receiving unit are performed by one of the web browser and a plug-in application of the web browser.

12. The network control apparatus of claim 8, wherein:
the network is a Universal Plug and Play (UPnP)-based network;
the network device is a UPnP device; and
the control command for controlling the network device is generated in a form of a UPnP simple object access protocol (SOAP) action.

13. The network control apparatus of claim 8, wherein the encryption process and the decryption process uses at least one of symmetrical encryption/decryption algorithms and public key encryption/decryption algorithms.

14. A server comprising:
a processor;
a control information request receiving unit which receives from the network controlling apparatus a control information request message that requests control information and other information, the control information being used to control a network device and the other information being used to configure a user interface or process an event;
an encrypting unit which encrypts the control information according to an encryption process; and
a control information transmitting unit which transmits the encrypted control information to the network controlling apparatus,
wherein the server encrypts the control information and does not encrypt the other information used to configure the user interface or process the event, the control information.

15. A non-transitory computer readable recording medium having recorded thereon a computer program for executing the method of claim 1.

16. A non-transitory computer readable recording medium having recorded thereon a computer program for executing the method of claim 7.

* * * * *